Patented June 20, 1944

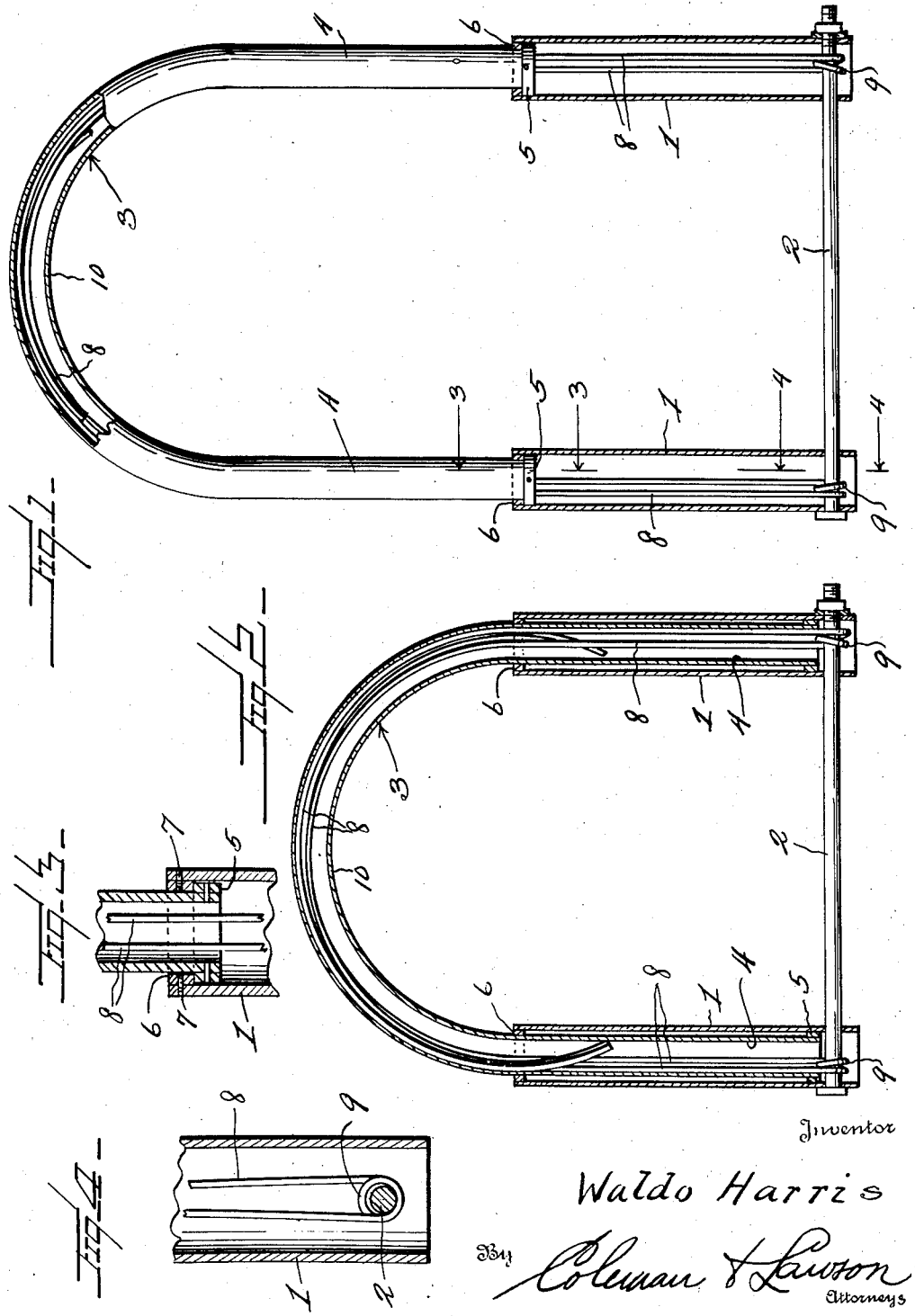

2,351,679

UNITED STATES PATENT OFFICE 2,351,679

SUPPORTING STAND

Waldo Harris, Lima, Peru

Application August 30, 1943, Serial No. 500,592

3 Claims. (Cl. 135—7.1)

This invention relates to a supporting stand, and has relation more particularly to a device of this kind intended for general use, and which has primarily for its object to provide a structure which is readily adjustable as the requirements of practice may dictate, and thereby making the stand of advantage in use in connection with blind flying hoods for airplanes, baby buggy tops, hospital screens, quick action camera stands and the like.

It is also an object of the invention to provide a stand of this kind comprising telescoping members wherein flexible elements are arranged within the telescoping members in a manner to assure sufficient frictional resistance to maintain the telescoping members in desired adjustment one relative to the other but allowing relative adjusting movement without the necessity of releasing any holding part.

The invention consists in the details of construction and in the combination and arrangement of the several parts of my improved supporting stand whereby certain important advantages are attained, as will be hereinafter more fully set forth.

In order that my invention may be better understood, I will now proceed to describe the same with reference to the accompanying drawing, wherein:

Figure 1 is a view in elevation, with portions in section, of a supporting stand constructed in accordance with an embodiment of my invention and in extended adjustment;

Figure 2 is a vertical sectional view, with portions in elevation, of the supporting stand as herein embodied in collapsed adjustment;

Figure 3 is an enlarged detailed sectional view taken substantially on the line 3—3 of Figure 1; and Figure 4 is an enlarged detailed sectional view taken substantially on the line 4—4 of Figure 1.

As disclosed in the accompanying drawing, the stand comprises two elongated tubular members 1 of desired dimensions having similar extremities arranged side by side in desired spaced relation and which are mounted upon a retainer bolt 2 which passes through similar end portions of the members 1.

Coacting with the members 1 is a bow section 3 having its end portions formed to provide parallel legs 4 of desired length and which legs 4 are telescopically received within the members 1 through the open ends thereof remote from the retainer bolt 2. The free extremities of the legs 4 are provided with the surrounding members or rings 5 which snugly fit within the members 1 and after the free end portions of the legs 4 have been placed within the members 1, the annular members or rings 6 are snugly fitted within the end portions of the members 1 through which the legs 4 enter, said rings 6 being held in place by the holding or binding screws 7. The rings 6 freely surround the legs 4 of the bow section 3 so that said legs 4 are free for endwise movement. The extent of outward movement of the legs 4 is limited by contact of the fixed rings 5 with the rings 6.

Associated with each of the tubular members 1 is a double length of spring wire 8, preferably steel, the central bend 9 of which encircling the portion of the retainer bolt 2 intersecting the member 1 with which the wire 8 is associated. This wire 8 is of such length as to have its free end portions extend a material distance beyond the entrance end of the tubular member and of a length preferably in excess of the length of the intermediate curved portion 10 of the bow section 3. As is clearly illustrated in the accompanying drawing, the extended portions of the two wires 8 extend through the intermediate curved portion 10 of the bow section 3 in opposite directions. The wires 8 possess sufficient inherent resiliency to create enough frictional contact from within on the bow section 3 to hold said section in any desired position with respect to the members 1, either fully extended, fully collapsed, or at any intermediate point. It is, therefore, believed to be obvious that the supporting stand as herein disclosed can be adjusted into any desired position substantially instantaneously by merely pushing or pulling the bow section 3 in desired placement. It is also believed to be obvious that the amount of force required to effect an adjustment will depend on the sizes of the tubing and the wires.

It is not desired to limit the invention to any particular use, although it can be employed to advantage in connection with camera stands, blind flying hoods for airplanes, baby buggy tops, hospital screens and the like, and where it is particularly desirable to provide means whereby vibration will be effectively resisted.

From the foregoing description it is thought to be obvious that a supporting stand constructed in accordance with my invention is particularly well adapted for use by reason of the convenience and facility with which it may be assembled and operated.

I claim:

1. A supporting element comprising a pair of tubular members, a tubular bow section having arms telescoping within the tubular members, and elongated flexible members secured within the tubular members and extending along within the bow section, said flexible members possessing inherent resiliency and having a natural curvature different than that of the bow section thereby creating enough friction from within on the bow section to hold the bow section in desired adjusted position with respect to the tubular members.

2. A supporting element comprising a pair of tubular members, a tubular bow section having arms telescoping within the tubular members, elongated flexible members secured within the tubular members and extending along within the bow section, said flexible members possessing inherent resiliency and having a natural curvature different than that of the bow section thereby creating enough friction from within on the bow section to hold the bow section in desired adjusted position with respect to the tubular members, said flexible members being each doubled upon itself and having its bend portion within a tubular member, and means for anchoring said bend portion to the tubular member.

3. A supporting element comprising a pair of tubular members, a tubular bow section having arms telescoping within the tubular members, elongated flexible members secured within the tubular members and extending along within the bow section, said flexible members possessing inherent resiliency and having a natural curvature different than that of the bow section thereby creating enough friction from within on the bow section to hold the bow section in desired adjusted position with respect to the tubular members, and means for positively limiting the extent of outward movement of the bow section with respect to the tubular members.

WALDO HARRIS.